United States Patent
Ramirez et al.

(10) Patent No.: US 7,685,398 B2
(45) Date of Patent: Mar. 23, 2010

(54) INTELLIGENT SYSTEM FOR DETERMINATION OF OPTIMAL PARTITION SIZE IN A BUILD TO ORDER ENVIRONMENT

(75) Inventors: Christopher W. Ramirez, Cedar Park, TX (US); Shree A. Dandekar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 979 days.

(21) Appl. No.: 11/436,322

(22) Filed: May 18, 2006

(65) Prior Publication Data

US 2007/0271437 A1 Nov. 22, 2007

(51) Int. Cl.
G06F 12/00 (2006.01)
G06F 9/445 (2006.01)
(52) U.S. Cl. ........................................ 711/171; 717/175
(58) Field of Classification Search ........................ None
See application file for complete search history.

(56) References Cited

U.S. PATENT DOCUMENTS

| | | | | |
|---|---|---|---|---|
| 5,351,195 | A | * | 9/1994 | Sherman ...................... 700/100 |
| 5,826,040 | A | * | 10/1998 | Fargher et al. ................. 705/8 |
| 5,966,732 | A | | 10/1999 | Assaf ......................... 711/170 |
| 6,138,179 | A | | 10/2000 | Chrabaszs et al. |
| 6,330,653 | B1 | | 12/2001 | Murray et al. ............... 711/173 |
| 6,351,850 | B1 | | 2/2002 | van Gilluwe et al. .......... 711/11 |
| 6,453,413 | B1 | | 9/2002 | Chen et al. |
| 6,636,958 | B2 | * | 10/2003 | Abboud et al. ............... 711/173 |
| 6,721,946 | B1 | * | 4/2004 | Fogarty et al. ............... 717/175 |
| 2002/0029217 | A1 | | 3/2002 | Huang ......................... 707/100 |
| 2002/0062405 | A1 | | 5/2002 | Ayyagari |
| 2002/0129217 | A1 | * | 9/2002 | Nichols ....................... 711/173 |

FOREIGN PATENT DOCUMENTS

| | | |
|---|---|---|
| JP | 8221258 | 8/1996 |
| WO | WO 96/26487 | 8/1996 |
| WO | WO 2004/010285 A1 | 1/2004 |

OTHER PUBLICATIONS http://www.ece.umd.edu/~ppetrov/tcad01.pfd: Petrov, Peter and Orailoglu, Alex "Performance and Power Effectiveness in Embedded Processors-Customizable Partitioned Caches" IEEE Transactions on Computer-Aided Design of Integrated Circuits and Systems, vol. 20, No. 11, Nov. 2001 pp. 1309-1318.
http://www.ece.umd.edu/~ppetrov/tcad01.pdf: Jain, Prabhat, Derek Chiou, Srinivas Devadas, Larry Rudolph "Application-Specific Memory Management for Embedded Systems" Computer Science and Artificial Intelligence Laboratory, Massachusetts Institute of Technology, Computation Structures Group Memo 427, Nov. 1999.

\* cited by examiner

*Primary Examiner*—Matt Kim
*Assistant Examiner*—Kaushikkumar Patel
(74) *Attorney, Agent, or Firm*—Hamilton & Terrile, LLP; Stephen A. Terrile

(57) ABSTRACT

An intelligent system for determining an optimal partition size on an information handling system. The system provides customers with an improved customer experience by offering a partition that is sized only as large as needed according to optional/locked/trial data downloaded for that system.

4 Claims, 4 Drawing Sheets

INTELLIGENT SYSTEM FOR DETERMINATION OF OPTIMAL PARTITION SIZE IN A BUILD TO ORDER ENVIRONMENT

BACKGROUND OF THE INVENTION

1. Field of the Invention

The present invention relates to the field of build to order manufacturing systems and more particularly to an intelligent system for determining an optimal partition size in a build to order environment.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known for original equipment manufacture (OEM) system manufacturers to designate a portion of a system hard drive to provide a safe recovery partition where diagnostics, images, installers, etc can be stored for later use. The OEM system manufacturers effectively lock this portion of the system hard drive so that customers cannot easily delete the partition and cannot easily manipulate or corrupt the partition. One potential issue relating to this safe recovery partition is that the available storage of the hard drive is reduced by the size of the safe recovery partition. So for example, a customer who purchases an 80 GB drive might only have access to 74 GB via the drive that is referred to as the C drive. The remainder of the hard drive is not easily accessible. This issue can upset some customers who desire access to all of the available storage of the hard drive.

In a build to order environment, estimating the space needed on a per-system basis can be difficult because the contents of the recovery partition are determined dynamically at system build time. To minimize a possible negative customer experience, it is desirable to provide a method for allocating just enough space for the recovery partition needed for the data on that particular order.

It is known to manufacturer information handling systems using a build to order model. One advantage of a build to order model over traditional fill the channel business model is the ability to change a customer image and have image in the field almost immediately instead of having to wait up to two months for distributors to sell their inventory. Additionally, some build to order manufacturers can determine factory usage needs on a daily basis. Thus, if there are 5000 orders in a particular day, a cell within the factory can build 50 systems during a shift, there are 50 cells operating during a shift and there are two shifts active, it can be determined that to build the 5000 ordered systems 50 cells in shift 1 and 50 cells in shift 2 can fill the orders and thus the factory need to open for a third shift. It is also foreseeable that a build to order environment might maintain several terabytes of optional, locked, or trial software on a factory install server. Loading some or all of this software onto a customer system can induce additional sales for the manufacturer of the information handling system by providing the customer with examples of software of which they might otherwise not be aware.

It would be desirable that based upon factory build times allotted for a particular day, anywhere from none to all of the optional data is downloaded to a customer's system for that particular day.

Because some of this content is locked or optional, in some cases it would provide the best customer experience if this data were in a dedicated partition, be it Host Protected Area (HPA), hidden, or normal. There is a customer need to make sure that this partition is sized only as large as needed according to the optional/locked/trial data downloaded for that system.

SUMMARY OF THE INVENTION

In accordance with the present invention, an intelligent system for determining an optimal partition size on an information handling system is set forth. The system provides customers with an improved customer experience by offering a partition that is sized only as large as needed according to optional/locked/trial data downloaded for that system.

Additionally, in accordance with the present invention, a method of providing content to a customer in a hidden partition of an information handling system is set forth. The content may include locked, optional or trial content. The method provides the flexibility of adding content to a partition based on a plurality of factory variables such as factory down time and factory install burn time. For example, based upon a list of systems to be built on a particular day, the factory is able to calculate required time in burn racks to cover the normal downloads (e.g., 20 minutes per system). If there is any excess time available (say burn rack capacity is 30 minutes per system based on amount of systems to be built that day), then the method is able to determine that for the particular day, there is 10 minutes per system to put as much optional, locked, or trial software as possible.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
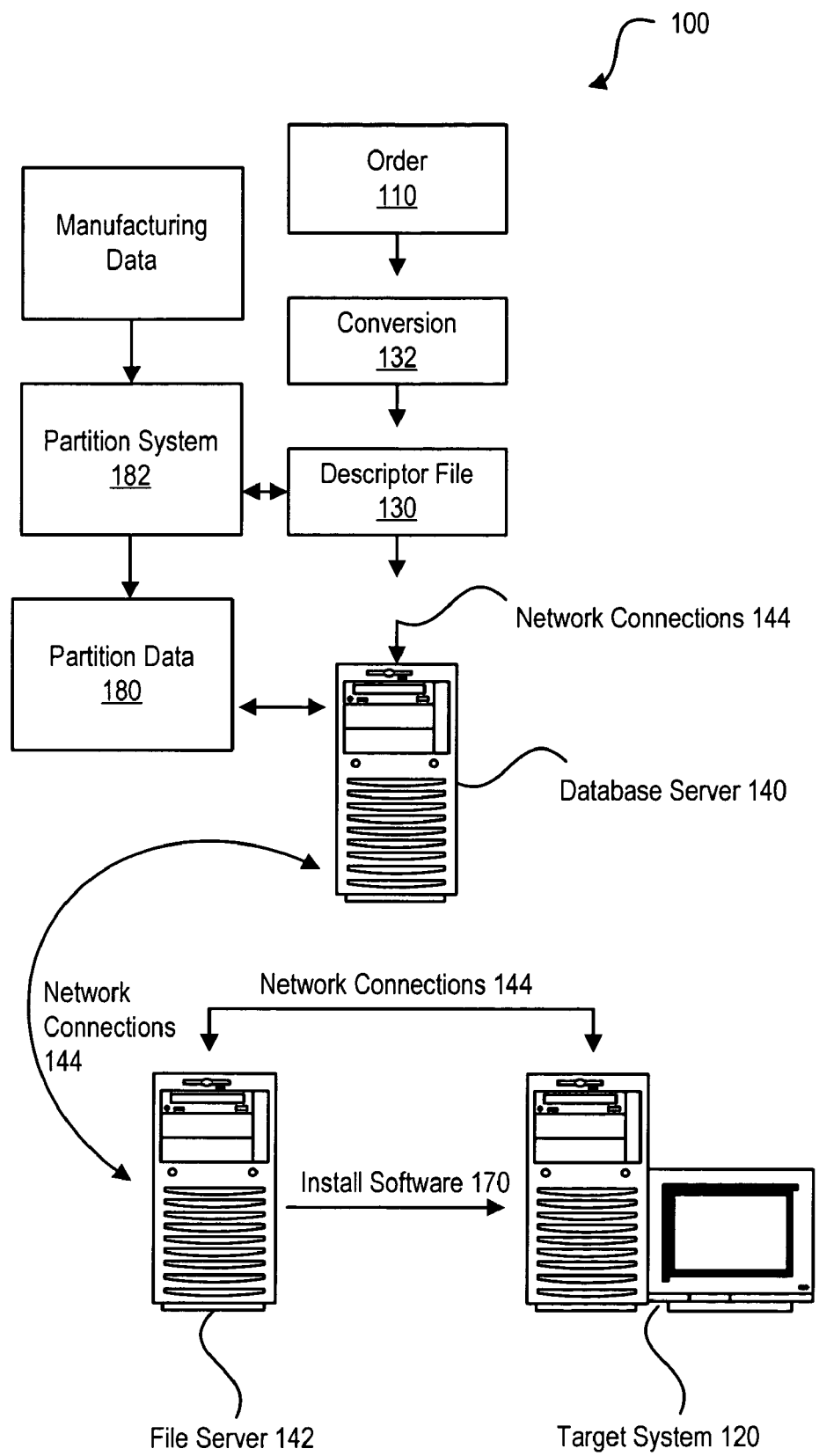
FIG. 1 shows a schematic diagram of a system for installing software which includes generating an optimally sized partition.

FIG. 1 is a schematic diagram of a software installation system 100 at an information handling system manufacturing site. In operation, an order 110 is placed to purchase a target information handling system 120. The target information handling system 120 to be manufactured contains a plurality of hardware and software components. For instance, target information handling system 120 might include a certain brand of hard drive, a particular type of monitor, a certain brand of processor, and software. The software may include a particular version of an operating system along with all appropriate driver software and other application software along with appropriate software bug fixes. The software may also include firewall software. Before target information handling system 120 is shipped to the customer, the plurality of components are installed and tested. Such software installation and testing advantageously ensures a reliable, working information handling system which is ready to operate when received by a customer.

Because different families of information handling systems and different individual computer components may require different software installations, it is desirable to determine which software to install on a target information handling system 120. A descriptor file 130 is provided by converting an order 110, which corresponds to a desired information handling system having desired components, into a computer readable format via conversion module 132.

Component descriptors are computer readable descriptions of the components of target information handling system 120 which components are defined by the order 110. In one embodiment, the component descriptors are included in a descriptor file called a system descriptor record which is a computer readable file containing a listing of the components, both hardware and software, to be installed onto target information handling system 120. Having read the plurality of component descriptors, database server 140 provides an image having a plurality of software components corresponding to the component descriptors to file server 142 over network connection 144. Network connections 144 may be any network connection well-known in the art, such as a local area network, an intranet, or the internet. The information contained in database server 140 is often updated such that the database contains a new factory build environment. The software is then installed on the target information handling system 120 via file server 142. The software is installed on the target information handling system via the image. The image may include self-configuring code.

The database server 140 may also be provided with partition data 180. The partition data provides the database server 140 with information regarding an optimal partition size based upon the software to be installed onto the target system as set forth by the descriptor file 130. The partition data 180 can also identify content to be installed onto the target information handling system based upon the size of the optimally sized partition and the content of the order 110

A partition system 182 dynamically generates the partition data 180 based upon applications that are to be installed on an individual target system 120. The applications that are to be installed may be derived from the descriptor file 130. Thus, the partition data 180 sets forth an optimal partition size. The partition system 182 may also receive manufacturing data such as factory down time and factory install burn time. Using this factory information as well as the information regarding components to be installed on the target system 120, the partition system 182 can generate a suggested list of content to install onto the optimally sized partition of the target information handling system 120.

For example, based upon a list of systems to be built on a certain Monday, the partition system 182 can calculate required time in burn racks to cover the normal downloads (20 minutes per system). If there is any excess time available (say burn rack capacity is 30 minutes per system based on amount of systems to be built that day), then it would be possible to determine that for Monday, there are an additional 10 minutes per system available to install optional, locked, or trial software.

Figure 2:
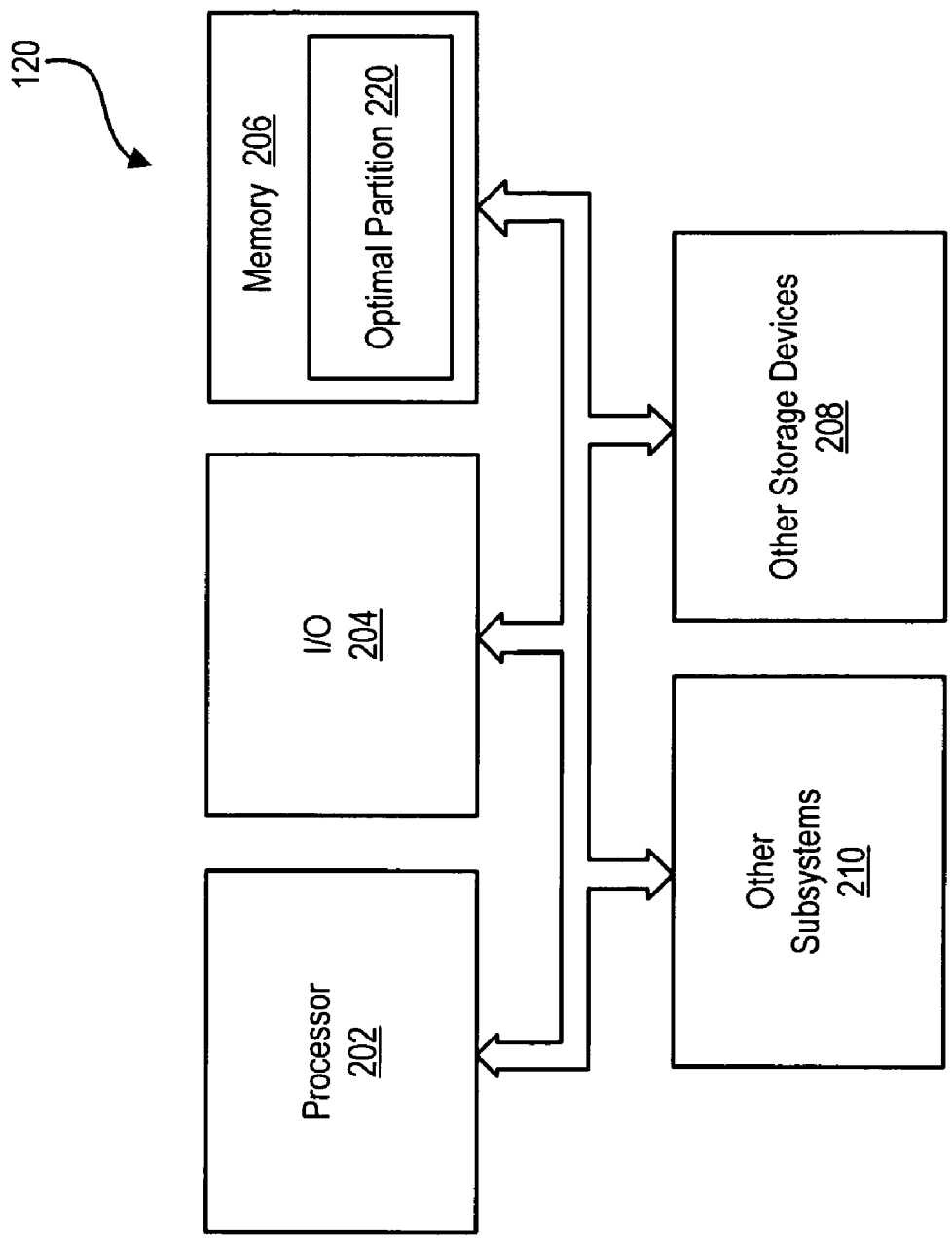
FIG. 2 shows a schematic block diagram of an information handling system having an optimally sized partition.

Referring to FIG. 2, a system block diagram of a target information handling system 120 is shown. The information handling system 120 includes a processor 202, input/output (I/O) devices 204, such as a display, a keyboard, a mouse, and associated controllers, memory 206 including non-volatile memory such as a hard disk drive 206 and volatile memory such as random access memory, and other storage devices 208, such as a CD-ROM or DVD disk and drive and other memory devices, and various other subsystems 210, all interconnected via one or more buses, shown collectively as bus 312.

An optimally sized partition 220 is stored on the memory 206 of the information handling system 120 and is executed by the processor 202 of the information handling system 120. Content identified by the partition system 182 may be stored within the optimally sized partition.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
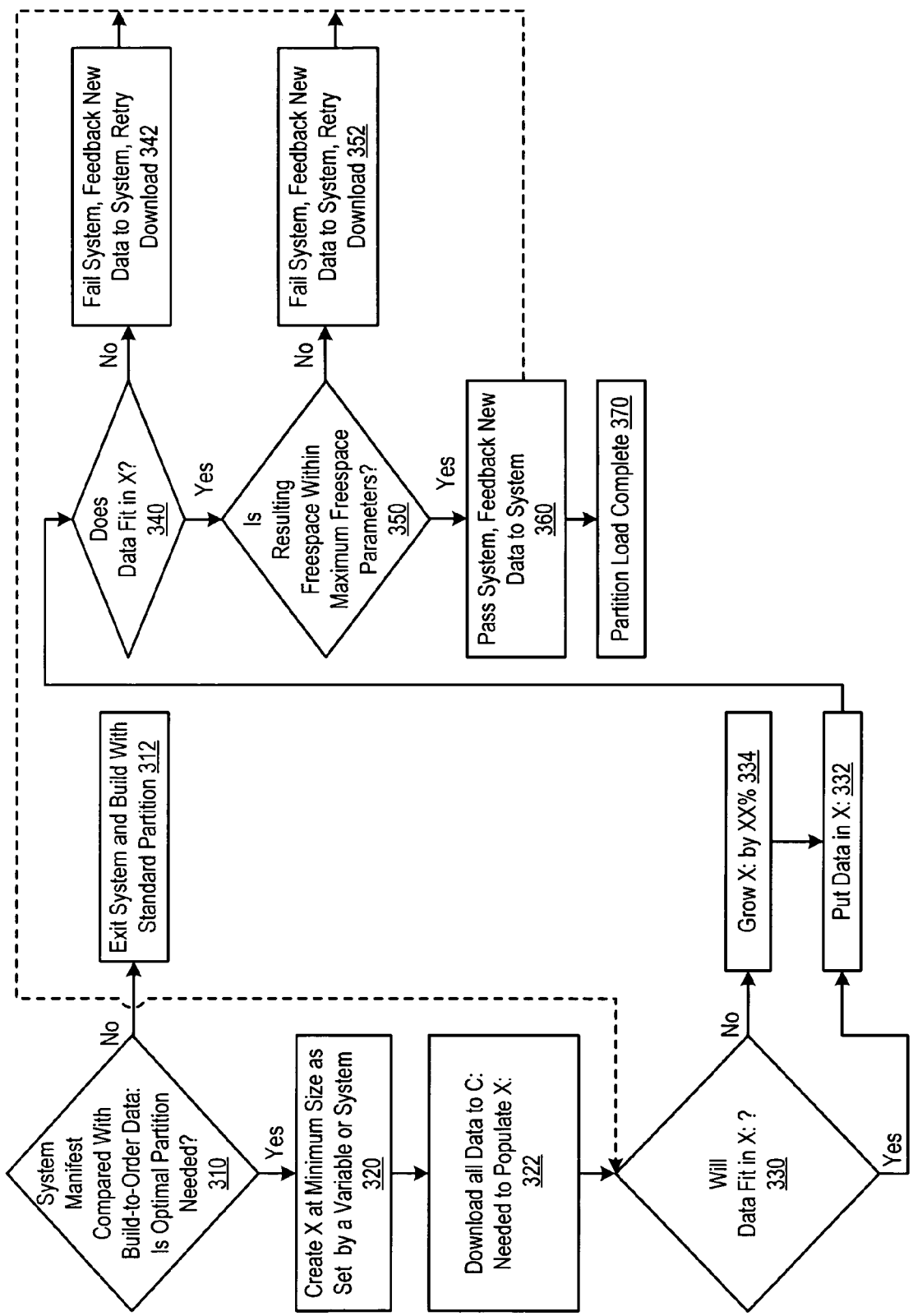
FIG. 3 shows a flow chart of the operation of a system for determining an optimal partition size.

Referring to FIG. 3, a flow chart of the operation of the partition system 182 for determining an optimal partition size is shown. More specifically, the system starts executing by comparing the system manifest with the build to order data to determine whether an optimal partition is desirable at step 310. If an optimal partition is not desired, then the partition system 182 exits and the information handling system is built with a standard partition at step 312.

If an optimal partition is desirable, then the partition system 182 creates a partition X at a minimum size as set by a variable provided to the partition system or as preset by the partition system at step 320. Next, all of the data is loaded onto the C drive which is needed to populate the X partition at step 322. (Alternately, the partition system 182 can calculate the size of all files that are designated for the X partition from the metadata (e.g., the descriptor file) that is used to load content onto the C partition.)

Next, the partition system determines whether the X partition is large enough based upon the information to be loaded onto the X partition at step 330. The determination of whether the X partition is large enough can be based upon metadata from prior downloads or based upon the individual file size, file types etc. of the information to be loaded onto this particular X partition. If the partition size is large enough, then the data may be loaded onto the partition at step 332. If the partition size is not large enough, then the partition size is grown by a predetermined percentage of the overall size of the X partition (e.g., XX %) at step 334 and then the data may be loaded onto the partition at step 332.

The partition system 182 then determines ether all of the data fits in the X partition at step 340. If the data does not fit, then the operation fails at step 342 and feedback is provided to the partition system 182 indicating that a larger partition is needed for this particular configuration. The partition system 182 then returns to step 330 to retry loading the information onto a larger X partition. If all of the data does fit in the X partition, then the partition system 182 determines whether the resulting free space in the X partition (i.e., the space remaining within the partition after the information is loaded onto the partition) is within predefined maximum free space parameters at step 350. The maximum free space parameters are determined to minimize the size of the remaining free space within the X partition, while allowing all required information to be loaded onto the partition. Thus, the maximum free space is used to determine an optimal size of the X partition.

If the resulting free space is not within the maximum free space parameters, then the operation fails at step 352 and feedback is provided to the partition system 182 that the partition is too large for this particular configuration. The partition system 182 then returns to step 330 to retry loading the information onto a smaller X partition. If the resulting free space is within the maximum free space parameters, then the operation passes at step 360. When the operation passes, this information is feedback to the partition system 182 to reinforce that an optimal partition size has been used. The partition load then completes at step 370.

Figure 4:
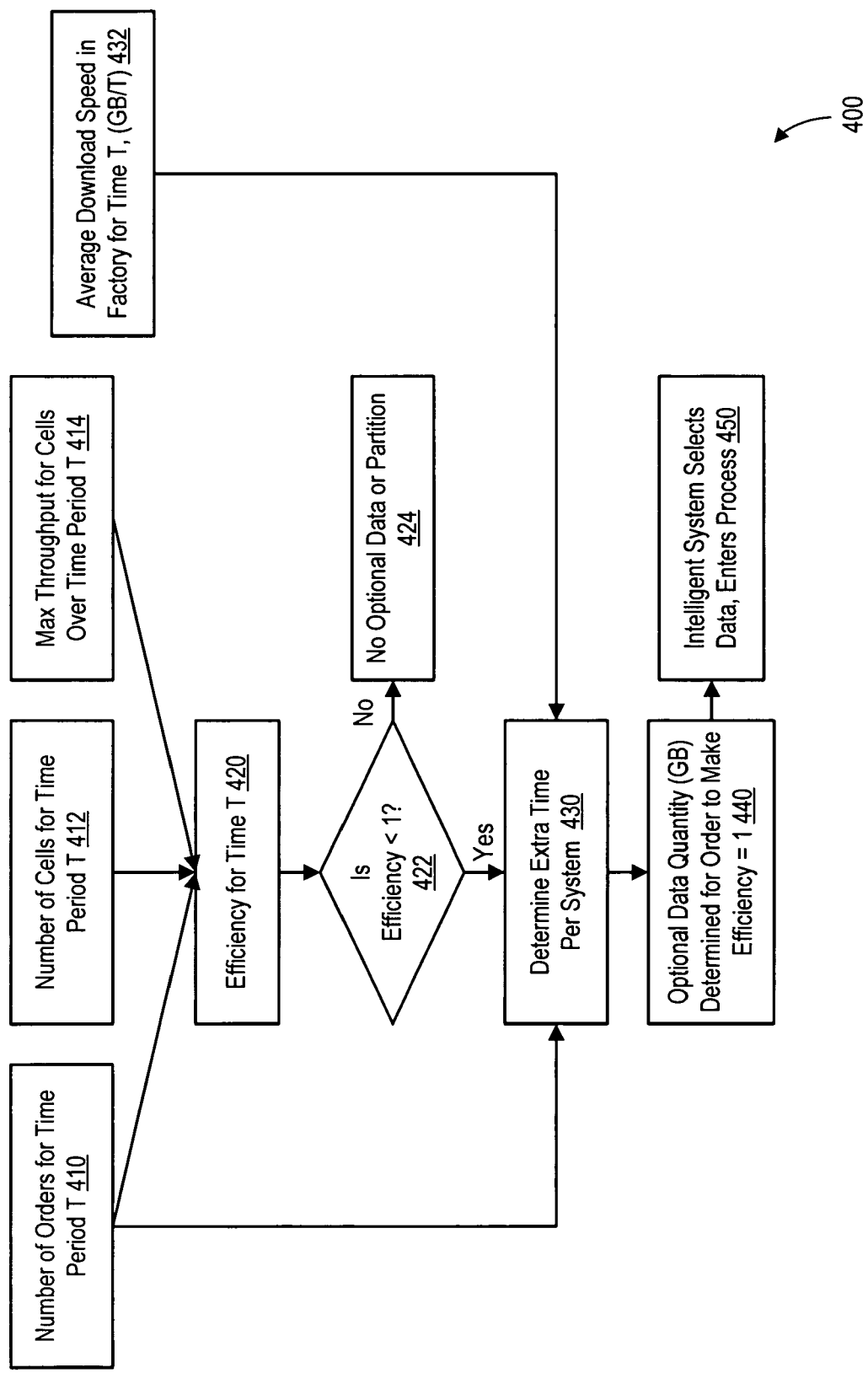
FIG. 4 shows a flow chart of the operation of a system for optionally providing content to an information handling system based upon factory availability.

FIG. 4 shows a flow chart of the operation of a system 400 for optionally providing content to an information handling system based upon factory availability. The system 400 identifies any excess download capacity time in the factory and uses this excess download capacity to load additional software including some or all of the optional, locked or trial software packages that are maintained by the manufacturer. While this additional software isn't required to be on the information handling system, the presence of the software on the information handling system may result in a better customer experience and may additionally allow the manufacturer to obtain an additional sale (i.e., to increase the margin on the information handling system) if the customer likes some or all of the additional software and decides to buy some or all of the additional software after point of sale.

More specifically, the system 400 begins operation by calculating a plurality of parameters for the factory for a particular time period. The parameters include the number of orders for a time period T 410, the number of cells for a time period T 412 and the maximum throughput of the cells over a time period T 414. These parameters are used to determine an efficiency parameter at step 420. Next the system determines whether the efficiency parameter is less than one at step 422. If the efficiency parameter is greater than or equal to one, then there is no excess download capacity and the system does not install optional data or an extended partition at step 424.

If the efficiency parameter is less then one, then there is excess download capacity and the system 400 proceeds to determine extra available download capacity per system at step 430. The determination uses the number of orders for a time period, as well as an average download speed in the factory for a time T 432. The extra available download capacity is determined where:

Orders for time period T in the factory=R
Cells working for time period T=C
Maximum throughput per cell (max systems built) for time period T=M/C
Efficiency=R/C/(M/C)

This determination assumes that most of the build system time is taken up in the burn racks where software content is downloaded across the factory network.

Thus for example, if the factory receives 2500 orders for Monday, and 50 cells are working Monday, and each cell has a maximum throughput of 50 systems a day, the Efficiency=$(^{2500}/_{50})/50=1=100\%$. I.e. all cells are maxed out all day to deliver 2500 cells.

Now suppose that there are only 1500 orders on Monday, still with 50 shifts and 50 systems a day per cell. The efficiency equation thus produces an efficiency parameter:
Efficiency=$(^{1500}/_{50})/50=0.6=60\%$ This efficiency parameter this indicates that for 20% of the download time, the factory network is not being utilized. Because of time period is 1 day or 24 hours, this means that there are 9.6 hours of excess time to spend on the 1500 systems. That's approximately 34560 seconds, total, or 23.04 seconds per system.

If the average download speed of the factory network is 100 MB/s, this means that there is time to add 2.3 GB of optional data to each system. Thus at step 440, the system 400 determines an optional data quantity for the efficiency parameter to substantially equal 1. Once the optional data quantity is determined, then the intelligent system selects the data to download as well as an optimal partition size and begins the process of creating the partition and downloading the additional data at step 450.

Now that the size of the data is known, the intelligent system to build the partition can be invoked to build a partition that is just big enough to hold this data. Alternately, this data can be loaded into a partition already present.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for optionally loading additional contents onto an information handling system comprising:
   determining an efficiency parameter for a factory where content is being downloaded onto the information handling system, the efficiency parameter identifying excess download capacity of the factory;
   determining a quantity of data to download onto the information handling system based upon the excess download capacity;
   loading additional information onto the information handling system based upon the quantity of data;
   wherein determining the efficiency parameter includes
   identifying a number of orders for a time period;
   identifying a number of cells on which data is downloaded; and
   determining a maximum throughput for each of the cells over the time period.

2. The method of claim 1 wherein:
   the additional information loaded onto the information handling system includes at least one of optional content, locked content and trial content.

3. The method of claim 1 further comprising:
   determining excess download capacity available for each information handling system on which the additional content is to be loaded.

4. The method of claim 1 further comprising:
   creating an optimal partition for the information handling system; and,
   downloading the additional information onto the optimal partition.

* * * * *